(12) United States Patent
Thomas (10) Patent No.: US 8,928,460 B2
(45) Date of Patent: Jan. 6, 2015

(54) DEVICE FOR LOCATING OBJECTS BY RFID COMMUNICATION

(75) Inventor: Thierry Thomas, Varces Allieres et Risset (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 566 days.

(21) Appl. No.: 12/961,760

(22) Filed: Dec. 7, 2010

(65) Prior Publication Data

US 2011/0133889 A1 Jun. 9, 2011

(30) Foreign Application Priority Data

Dec. 8, 2009 (FR) ...................................... 09 05941

(51) Int. Cl.
*G08B 5/22* (2006.01)
*G08B 13/14* (2006.01)
*H01Q 21/12* (2006.01)
*H01Q 21/00* (2006.01)
*H01Q 9/16* (2006.01)
*G06K 7/00* (2006.01)
*G06K 7/10* (2006.01)
*G06K 17/00* (2006.01)

(52) U.S. Cl.
CPC .......... *G06K 7/0008* (2013.01); *G06K 7/10079* (2013.01); *G06K 17/00* (2013.01); *G06K 2017/0045* (2013.01)
USPC ...... 340/8.1; 340/572.2; 340/572.8; 343/812; 343/814; 343/816; 343/820

(58) Field of Classification Search
CPC .................................. G08B 13/14; H04Q 5/22
USPC ............................................ 340/572.1, 572.7
See application file for complete search history.

(56) References Cited

U.S. PATENT DOCUMENTS

| | | | |
|---|---|---|---|
| 6,587,698 B1 * | 7/2003 | Dosch | 455/558 |
| 6,687,506 B1 * | 2/2004 | Girod | 455/456.4 |
| 2006/0028344 A1 * | 2/2006 | Forster | 340/572.7 |
| 2007/0210923 A1 * | 9/2007 | Butler et al. | 340/572.8 |
| 2008/0100446 A1 * | 5/2008 | Shintani | 340/572.2 |
| 2008/0272914 A1 * | 11/2008 | Murray et al. | 340/572.1 |
| 2008/0278289 A1 | 11/2008 | Gantner | |
| 2009/0085741 A1 | 4/2009 | Ravi et al. | |

FOREIGN PATENT DOCUMENTS

| | | | |
|---|---|---|---|
| FR | 2891980 A1 | 4/2007 | |
| FR | 2907950 A1 | 5/2008 | |
| WO | 2008045075 A2 | 4/2008 | |
| WO | 2009034526 A1 | 3/2009 | |

* cited by examiner

*Primary Examiner* — Jennifer Mehmood
*Assistant Examiner* — Pameshanand Mahase
(74) *Attorney, Agent, or Firm* — Baker & Hostetler LLP (57) ABSTRACT

The invention relates to the locating and identifying of objects with radiofrequency communication by inductive coupling, without electrical contact, between a reader and a tag. The device includes an array of N fixed RFID markers of RFID tag type, with inductive antennas placed at known positions, N being an integer greater than 1 and an RFID tag reader provided with a fixed reading inductive antenna passing in proximity to the N markers. The position of the N markers with respect to the inductive reading antenna is such that the mutual inductance between the inductive antenna of any marker and the inductive reading antenna is zero when no object to be located is present in the vicinity of the array of markers, and nonzero when an RFID tag is present in the vicinity of the marker considered. A coupling is established in the presence of a mobile tag in proximity to a marker.

19 Claims, 6 Drawing Sheets

Fig. 7

DEVICE FOR LOCATING OBJECTS BY RFID COMMUNICATION

CROSS-REFERENCE TO RELATED APPLICATION

This application claims priority to foreign French patent application No. FR 09 05941, filed on Dec. 8, 2009, the disclosure of which is incorporated by reference in its entirety.

FIELD OF THE INVENTION

The invention relates to the locating and identifying of objects by way of a radiofrequency communication in a reactive zone (inductive coupling), without physical contact, between a reader and an electronic tag. The reader emits data by way of an antenna, the electronic tag reacts to this emission, and the reader detects the reaction of the tag. The way in which the tag reacts is dependent both on data transmitted by the reader in the course of the emission (for example interrogation data) and on data specific to the tag (for example identification data), so that the reader can identify the tag.

BACKGROUND OF THE INVENTION

This type of communication forms part of the field of application known by the term RFID (Radio Frequency IDentification). It is used for example for contactless badges or cards intended for authorizing access, or else identification tags stuck to objects to be identified.

In what follows, the card, the badge or the tag will be designated by the word "tag" or "RFID tag", it being understood that this term does not limitingly designate a particular form of these objects.

Transmission is usually done by way of a radiofrequency magnetic field and it uses an inductive antenna forming part of the reader and an inductive antenna forming part of the tag. These antennas can consist of one or more turns of a conducting winding integrated into the tag. This winding is associated with electronic circuits intended for carrying out functions of frequency tuning, damping and impedance matching, and the assembly consisting of the winding and these auxiliary components will be called an inductive antenna. It is mainly the voltages induced in the windings by the high-frequency magnetic field which serve to transport information from the reader to the tag and vice versa. In addition to the inductive antenna serving for information exchange and optionally for energy reception, the tag generally comprises an integrated circuit microchip which handles the function of analysing the interrogation data and the production of the response.

In these systems, the reader generally dispatches a radiofrequency carrier, modulated in accordance with a communication protocol so as to constitute a radiofrequency interrogation signal; a typical frequency in the case of tags with inductive antenna is 13.56 MHz, modulated in amplitude or in phase or in frequency and it is this frequency that will be mentioned in the examples which follow. The reader then waits for a response; if a tag is present in the geographical zone close to the reader and if the interrogation signal involves a response therefrom, the tag reacts and emits an item of information in return towards the reader. The response may be the emission of a simple digital identification, or else it may be more complex.

The tag may be devoid of any autonomous power supply source, and in this case the energy which enables it to emit its response is provided in an inductive manner by the radiofrequency magnetic field produced by the antenna of the reader via the antenna of the tag; the energy can even be provided by the modulated radiofrequency magnetic field during the interrogation signal communication times, for communication applications at short distances (up to a few tens of centimeters).

The inductive antenna of the reader preferably plays both a role of signal emission antenna and a role of reception antenna for detecting an electromagnetic field modulation induced by the response of the tag. The response of the tag is generally established in the form of a modulation of impedance of its antenna; because of the electromagnetic coupling of the antenna of the tag and of the antenna of the reader when the tag is in a reactive zone (distance less than a twentieth of the wavelength, where the magnetic field is mainly of reactive rather than radiative type), this modulation gives rise to a modification of the impedance of the antenna of the reader, such as it is seen by the reader's circuits connected to this antenna; it is this impedance modification which allows the detection and then the analysis of the response.

The reader modulates its signal with carrier frequency Fp for a duration T so as to constitute a recognizable interrogation signal destined for the tag; there follows a second duration T' where the signal with carrier frequency Fp of the reader is not modulated, so as to receive a response from a tag, if one is present.

Various systems operating along these principles have already been proposed in the past, for aiding not only the identification of objects (by way of an RFID tag stuck to the object) but also the locating of the objects in space.

In patent publication FR 2 891 980, RFID tags are at known positions and make it possible to locate a reader.

In patent publication FR 2 907 950, a mobile reader moves and identifies objects furnished with a tag when it passes in proximity to these objects. It knows its own position at any moment by virtue of a satellite positioning system and deduces therefrom the position of the objects encountered.

In the publication US 2008/0278289, beacons produce a magnetic field. A tag passing in proximity detects the variable levels of magnetic field received from the various beacons, dependent on the relative position of the tag with respect to the beacons; these levels are dispatched to a reader which deduces therefrom a position of the tag.

In patent publication US 2009/0085741, an RFID reader is located with respect to tags with known positions.

In patent publication WO 2008/45075, the position of an object provided with an RFID tag is detected with respect to an array of fixed antennas constituting as many fixed readers each capable of individually detecting the presence of a mobile tag. The reading circuits proper are grouped into a single reading circuit linked electrically to each of the fixed antennas by as many individual reading pathways (consisting of direct electrical connections) as there are fixed antennas.

Finally, in patent publication WO 2009/034526, there is a radiofrequency antenna matrix constituting an antenna with configurable radiation pattern making it possible to focus the RFID link in a particular direction, with the aim of following the three-dimensional displacements of an object carrying an RFID tag.

SUMMARY OF THE INVENTION

The present invention provides a system for locating, and also for identifying, RFID tags (and not a mobile reader) that is simpler than the systems which have been proposed in the past.

According to embodiments of the invention, a device for locating objects includes a tag of RFID type with inductive antenna, the device comprising an array of N fixed RFID tags with inductive antennas (or markers) placed at known positions, N being an integer greater than 1, characterized in that it furthermore comprises an RFID tag reader provided with a fixed reading inductive antenna passing in proximity to the N antennas of the N markers, the configuration of the inductive reading antenna with respect to the positions of the N antennas of the N markers being such that the mutual inductance between the inductive antenna of any marker and the inductive reading antenna is zero. The electrical activity induced in any marker by the inductive reading antenna is therefore zero when no object to be located is present in the vicinity of the array of fixed antennas, but it becomes nonzero when the RFID tag of an object to be located is present in the vicinity of the marker considered. It may be said that an electromagnetic coupling, taken in the broad sense, occurs between the inductive reading antenna and the antenna of the RFID tag and an electromagnetic coupling occurs between the latter and the antenna of the marker, so that a resulting electromagnetic coupling is produced between the inductive reading antenna and the marker.

In what follows, a fixed RFID tag with inductive antenna will be called a "marker"; this definition does not exclude the possibility that the marker may optionally comprise elements other than those which are strictly necessary for the operation of an RFID tag.

The reader emits via its antenna interrogations destined for the markers and possible tags which might be in the vicinity of this antenna; it does not obtain any response from the N markers if there is no tag other than the markers since the mutual inductive coupling is zero between the antenna of the reader and the antenna of the markers. But if a mobile object furnished with an RFID tag is brought close both to the reading antenna and to the antenna of at least one of the N markers, an electrical activity is induced by the reading antenna in the antenna of the marker by way of the antenna of the RFID tag of the mobile object, which amounts to saying that an electromagnetic coupling is established between the antenna of the marker and the reading antenna by way of the antenna of the mobile tag. This coupling implies that the marker will be able to respond to the reader by giving its unique identification out of the N marker identities. This identification of one marker out of N is an indication of the location of the object in proximity to this marker. If the tag of the mobile object establishes a significant coupling with several markers out of the N markers, each can dispatch its identification, thus also giving an indication of location of the object in a zone where such multiple coupling is possible.

Provision is preferably made for the array of markers to be organized into rows whose locus links the centres of the antennas of the markers, the array defining zones situated between these rows, and the locating comprises the reception of identification data for several markers bracketing a zone in which the object is placed. The array of rows may be organized into an array of regularly distributed rows and columns, but this is not compulsory.

The array of markers may be organized according to several independent reading pathways each comprising a respective reading antenna. The markers are then organized into several groups, each group being associated with an inductive antenna of a respective independent reading pathway; it will then be possible to locate the mobile object with respect to the markers of one or the other of the groups if its RFID tag introduces an electromagnetic coupling between a marker of a group and the reading antenna; it will also be possible to locate the mobile object with respect to the markers of both groups at one and the same time if the mobile object introduces an electromagnetic coupling between two antennas belonging to two different groups and the reading antennas of these two groups. The independent reading pathways may be juxtaposed or nested one in the other. Provision is made for each reading antenna to be in zero mutual inductance with the antennas of the markers of the respective group of markers which is associated with this reading antenna. Provision is also made for all the markers to have their antenna in zero mutual inductance with at least one reading antenna, the reading antenna of the group to which they belong. It is possible that a marker may have its antenna in zero mutual inductance with more than one reading antenna.

The location of the object is obtained on account of the identification of one or more markers in proximity to which the object is situated. This location can be achieved directly by deduction from the list of identifiers obtained by successive interrogations executed by the reader by way of the reading antenna, this list of identifiers containing the identifier of the tag associated with the mobile object and the identifiers of the markers rendered identifiable due to the presence of the mobile tag.

Location of several mobile objects on the basis of a single list of identifiers leads to ambiguities. In the case of several independent reading pathways, the identification of several objects becomes possible through the obtaining of several lists of identifiers, one per reading pathway.

Location of the object carrying a tag can be achieved indirectly by way of the marker or markers which have reacted to the presence of the mobile tag. For this purpose, the markers are fitted with reception and analysis means so as to intercept the data identifying the mobile tag when the latter dispatches them in response to the reader, the markers retransmitting towards the reader the mobile tag's identification data associated with their own identification data when they themselves are prompted by an interrogation of the reader.

In the case of several objects, the markers can intercept those identifiers of the mobile tag or tags with which they react. To establish the location of the objects, the reader then has a list of identifiers of the mobile tags and some of the markers, as well as sub-lists of identifiers of mobile tags per identified marker. The ambiguities of location of several objects are thus reduced.

The configurations of the antennas of the reading pathways can delimit partly overlapping areas, or conversely disjoint areas, in a plane.

The markers are preferably designed so as to be able to detect and analyse the identification information for the tags associated with the objects to be located.

The RFID reader can also be used to undertake analyses for various levels of radiofrequency field.

BRIEF DESCRIPTION OF THE DRAWINGS

Other characteristics and advantages of the invention will become apparent on reading the detailed description which follows and which is given with reference to the appended drawings in which.

DETAILED DESCRIPTION

Figure 1:
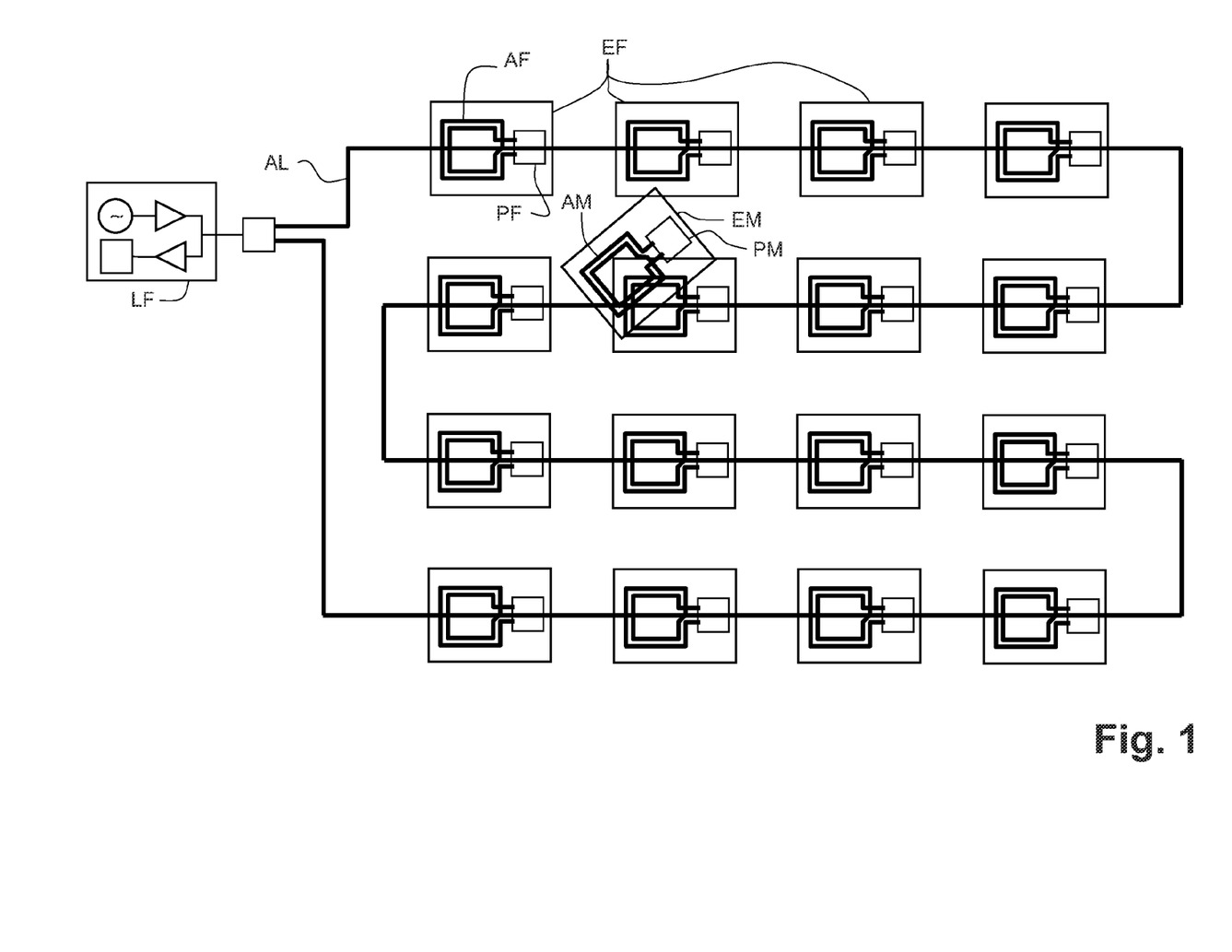
FIG. 1 represents the general principle of the invention.

In FIG. 1 there has been represented an array of N fixed RFID tags (in this example N=16) that will be called "markers" for convenience, the antennas of which are placed at known positions with respect to one another. They are preferably disposed at the nodes of a regular mesh in rows and columns, but the array could be organized differently, for example along concentric circles and radii distributed regularly, or else according to a non-regular grid of nodes if this is preferable in the application considered. It is even possible to have a single row of antennas if location in relation to a single dimension is sought. It is with respect to these nodes of the array that it is sought to determine the position of an object carrying an RFID tag that will be called a "mobile tag".

The concepts of fixed and mobile are relative; what matters is the mobile tag's relative position, and not an absolute position, which is sought with respect to the array; the markers are fixed with respect to the reading antenna or antennas, it being possible for the assembly to be movable.

The markers are designated by the reference EF (fixed tag); a mobile tag is designated by the reference EM. By way of particularly beneficial practical example, the markers are stuck to a horizontal board or embedded below the surface of this board, and a mobile tag is stuck under an object that will be placed on the board. The board is not represented, neither is the object, but it is seen in FIG. 1 that the mobile tag is overlaid on the array of markers.

The fact that the markers are represented exactly like the mobile tag does not, however, signify that they are identical to the mobile tag, but the mobile tag and the markers have in common the fact that they behave like RFID tags, namely that they can respond to an interrogation of a reader if the electromagnetic coupling between the reader and the antenna of the marker is sufficient. By way of example of a possible difference between the markers and the mobile tags: provision may be made for the markers to be supplied with energy by a fixed power supply source bound to the board, whereas the mobile tag is powered either by a cell (assisted power tag) or by the electromagnetic energy provided by electromagnetic coupling during an RFID communication (remotely powered tag).

The markers comprise an integrated-circuit microchip PF which incorporates the circuitry required for the detection of an RFID interrogation and for the production of a response including an identification of the marker; they also comprise an antenna AF. The mobile tag also comprises an integrated circuit microchip PM and an antenna AM, with the same functionalities.

In the locating system according to the invention, use is made of a communication by way of antennas of inductive type which are particularly well suited for relatively low carrier frequencies, and notably a frequency of 13.56 MHz, used in certain RFID communication standards. The inductive antennas AM and AF consist of a simple winding of one or more turns of conducting wire forming a loop capable of engendering (in emission) or of receiving (in reception) a radiofrequency magnetic flux. They are usually associated with a capacitor which makes it possible to constitute with the winding a resonant circuit at a chosen working frequency. These capacitors are not represented.

The locating device according to the invention comprises not only the array of N markers but also a fixed RFID reader (reference LF) with all the functionalities required for an RFID communication and an inductive antenna AL which serves both for the emission of interrogation signals and for the detection of response signals. The inductive antenna passes in proximity to all the markers, but according to a geometric configuration such that the mutual inductance between the inductive antenna of the reader and the inductive antenna of the marker is zero. Consequently, the electrical activity, that will be referred to as electromagnetic coupling (in the broad sense), induced in the marker by the inductive reading antenna is zero in the absence of any mobile tag in proximity to the array of markers; this activity is conversely nonzero when the mobile tag is present in the vicinity of the marker. The expression "zero electromagnetic coupling" is understood to mean a coupling that is as close as possible to zero and in any event a coupling such that the reader cannot detect a response of the marker when it emits an RFID interrogation signal, either because the marker quite simply does not detect the interrogation, or because it detects it but its response is not detectable by the antenna of the reader.

The simplest exemplary embodiment allowing the mutual inductance to be zero is as follows: the antenna of the reader is a conducting wire which passes parallel to the plane of the antenna of the marker and along an axis of symmetry of the winding which constitutes the antenna of the marker. The zero mutual inductance relies in a more general manner on the fact that when a nonzero magnetic field is produced by the antenna of the reader, the flux of this magnetic field, integrated over the entire surface of the antenna of the marker, must be zero, a positive flux being compensated as completely as possible by a negative flux, and such is indeed the case when the antenna wire of the reader passes parallel to the plane of the winding along an axis of symmetry of the winding. Other means than symmetry are possible for obtaining a zero mutual inductance, for example an auxiliary winding generating a compensation magnetic flux, but these means are more complex than simple symmetry.

Seen in FIG. 1 is a fixed reader antenna wire AL which forms a complete loop, and this wire passes along an axis of symmetry of all the inductive antennas AF of the markers EF. A single wire is represented but it will be understood that the winding AL can comprise several turns.

The RFID reader LF is of conventional type. It comprises the circuits required for dispatching a radiofrequency signal comprising interrogation data, and the circuits for detecting a response of inductive type. The reader also comprises conventional RFID processing means which make it possible to keep stock of the unique identification numbers of the RFID tags by electromagnetic coupling with its antenna, and optionally to recover additional information stored in the memory of the RFID tags. The reader thus determines the unique identifications of the mobile tag or tags and markers under nonzero electromagnetic coupling and optionally additional information placed in memory by the markers. A table of identification codes is provided in the reader, associating the markers with their sites in the device.

In the absence of any mobile tag in proximity to the array, no marker responds to the interrogations of the reader since the electromagnetic coupling between the antenna AL of the reader and the antennas AF of the markers is zero.

But in the presence of a mobile tag in proximity to the array, an indirect coupling is established by way of the antenna AM of the mobile tag: there is a nonzero (in general) mutual inductance between the antenna AL of the reader and the antenna AM of the mobile tag, and a nonzero (in general) mutual inductance between the antenna AM of the mobile tag and at least one marker antenna AF. This results in an electromagnetic coupling in fact between the antenna AL of the reader and the antenna of this marker. The coupling is established in principle with the marker or markers which are the closest to the mobile tag. In certain exceptional cases the coupling may not be established, for example if the winding of the mobile antenna is exactly overlaid on the winding of the antenna of a marker and therefore remains symmetric with respect to the antenna of the reader, but this probability normally relates to sites not envisaged for the application. To extend the coverage of the possible sites of the mobile tag, recourse will be had to several groups of markers and reading antennas.

By reason of this coupling, the reader receives a response to its interrogations. This response includes an identification of the fixed marker which is now coupled; it can also include an identification of the mobile tag which is also coupled to the antenna of the reader.

It may happen that the coupling is established with several markers neighbouring the mobile tag, in particular if the mobile tag is nearly equidistant from two or more close markers. The reader will be able to comprise an analysis and decision algorithm so as to determine the probable position of the mobile tag with respect to the array as a function of the various responses that it will have received.

The formula for calculating the mutual inductance M12 between two antennas such as the antenna of the reader, the antenna of a tag or the antenna of a marker, as a function of the configuration of the conductors of which these antennas are composed will be recalled simply (Neumann's formula):

$$M_{12} = \frac{\mu_0}{4\pi} \cdot \int_{C1} \int_{C2} \frac{\vec{dl_1} \cdot \vec{dl_2}}{d}$$

where $\mu_0$ is the permittivity of air, C1 and C2 denote the complete configurations of the conductors of the first and the second antennas respectively, $dl_1$ and $dl_2$ represent elementary segments (vectorial, therefore taking account of their signed orientations) of conductors of the first and the second antenna along these configurations, and d the distance between these segments. The mutual inductance results from a double integral for all the segments of each of the two antennas over the entirety of the circuits C1 and C2; each integral represents the influence of a segment of one antenna on all the elementary segments of the other antenna as a function of their separation d with respect to the first segment.

It is noted according to this formula that two perpendicular elementary segments have zero mutual inductance since the scalar product of the vectors representing these segments is zero. Also, two elementary segments $dl_1$ and $dl'_1$ of a first circuit, that are symmetric with respect to an elementary segment $dl_2$ of a second circuit and are oriented in opposite directions, engender mutual inductances which compensate one another. From which it follows that the mutual inductance between an elementary segment of the first circuit and a closed plane loop of the second circuit is zero if the elementary segment is placed in a plane perpendicular to the plane of the loop if this plane is a plane of symmetry dividing the loop into two symmetric parts.

From this formula it follows notably that the mutual inductance between two linear conductors that are perpendicular to one another is zero, that the mutual inductance between a linear conductor and a closed loop is zero if the conductor is parallel to the plane of the loop and is situated in a plane of symmetry perpendicular to the plane of the loop and which divides this loop into two symmetric halves; conversely the mutual inductance is not zero if the conductor parallel to the plane of the loop is situated in a plane perpendicular to the plane of the loop but which divides the loop into two dissymmetric parts.

This is the reason why FIG. 1 represents a particularly simple configuration of the antenna AL of the reader: it is placed in a plane which is parallel to the plane of the windings of all the antennas AF of markers, and it passes in front of each antenna while remaining in a plane of symmetry of the winding in front of which it passes. This configuration culminates in a zero mutual inductance and therefore an absence of electromagnetic coupling between the antenna of the reader and the antennas of markers in the absence of any mobile tag. But electromagnetic coupling is established between the reading antenna, the antenna of the marker, and the mobile tag antenna, when a mobile tag is in proximity to the marker.

Figure 2:
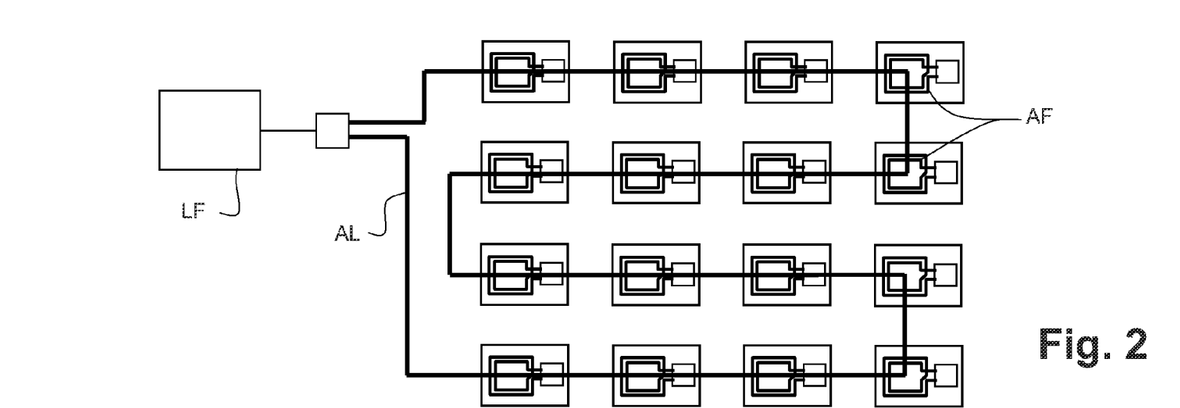
FIG. 2 represents a configuration of reading antenna different from that of FIG. 1.

In the configuration of FIG. 1, provision has been made for the centre of the markers to be situated each time on a linear segment of antenna AL which goes right across the antenna of the marker. Provision could also be made to centre certain antennas of markers on points of bifurcation of the direction of the antenna AL. FIG. 2 represents such a configuration: the antennas of rightmost-situated markers are centred on points of bifurcation of the antenna AL. It will be noted that the mutual inductance between the antenna AL and the antenna AF at these points remains zero, if the antenna AF remains symmetric with respect to each of the two segments linked to the bifurcation point. Indeed, each of the segments is placed individually in a plane of symmetry of the winding.

Figure 3:
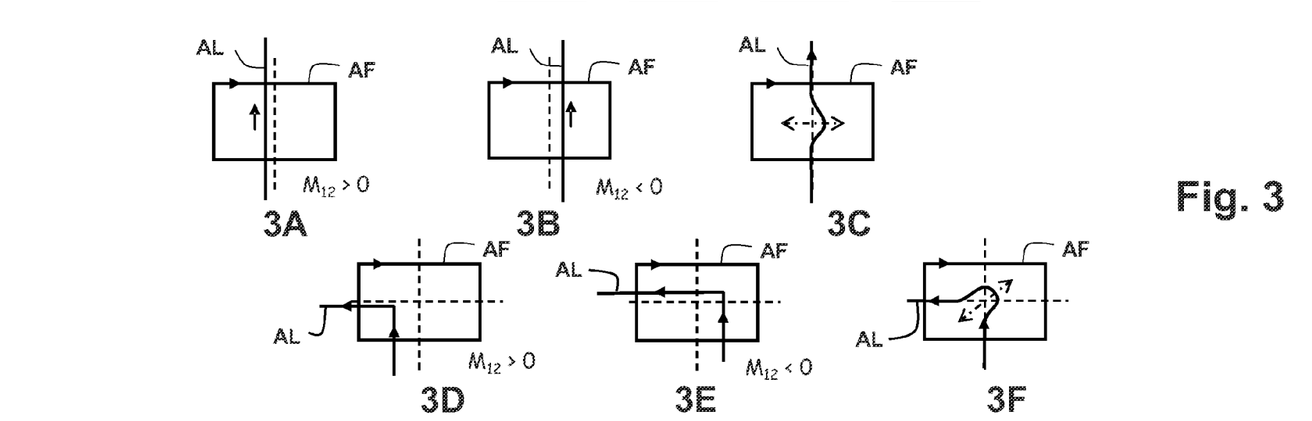
FIG. 3 represents the principle of an adjustment of value of the mutual inductance between a fixed antenna and the reading antenna.

It may be necessary to make provision to adjust the relative configuration of the antenna AL and of the antenna AF so as to ensure that the mutual inductance is as small as possible. Indeed, the theoretical calculation culminates in the conclusions which were given above as regards the optimal theoretical disposition of the elements closest to one another of the configurations of the conductors, but in all strictness the conductor elements of the reading antenna which are distantly separated from the antenna of the markers, have to be taken into account. Their contribution to the mutual inductance remains small having regard to the distance, but ultimately the mutual inductance may not be sufficiently small. In this case, if it is desired to adjust the mutual inductance so as to minimize it, it is possible to act by displacing or by deforming the segments of the reading antenna slightly with respect to the winding of the antennas of the markers.

The figure gives by way of example offset positions (not symmetric) making it possible to increase or to reduce the mutual inductance M12 between two elements if it was not a minimum in the practical embodiment. In 3A and 3B, the linear segment of reading antenna AL is offset to one side or the other so that this segment no longer coincides with the axis of symmetry of the antenna of the marker AF. In 3C the reading antenna segment is deformed to one side or the other of the axis of symmetry of the antenna of the marker. In 3D and 3E the conductor AL with right-angle bifurcation is offset with respect to a symmetry position. Finally, in 3F the segments with bifurcation are deformed and depart from the symmetric configuration that they had in FIG. 2.

The effect of these deformations may be checked by calculation, and an adjustment may be performed when the device is finally put in place.

In FIGS. 1 and 2, it has been considered that there was a single reading pathway in the RFID communication: there was a single reader and a single reading antenna. Operation may be improved by providing several independent reading pathways establishing RFID communications which each provide their own location data. The various pathways can thus provide complementary information, but, in all cases, with each reading pathway is associated a group of several markers, with the characteristic that the mutual inductances between the antennas of these markers and the reading antenna are zero, preferably a larger number of markers per reading pathway than the number of reading pathways so as to make it possible to significantly reduce the complexity of the device with respect to a device which would have as many or more reading pathways than there are markers throughout the device.

The various reading pathways each comprise a respective reading antenna, but the associated circuits, that is to say the RFID reader, may be shared, for example by time-division multiplexing, between the various pathways.

Figure 4:
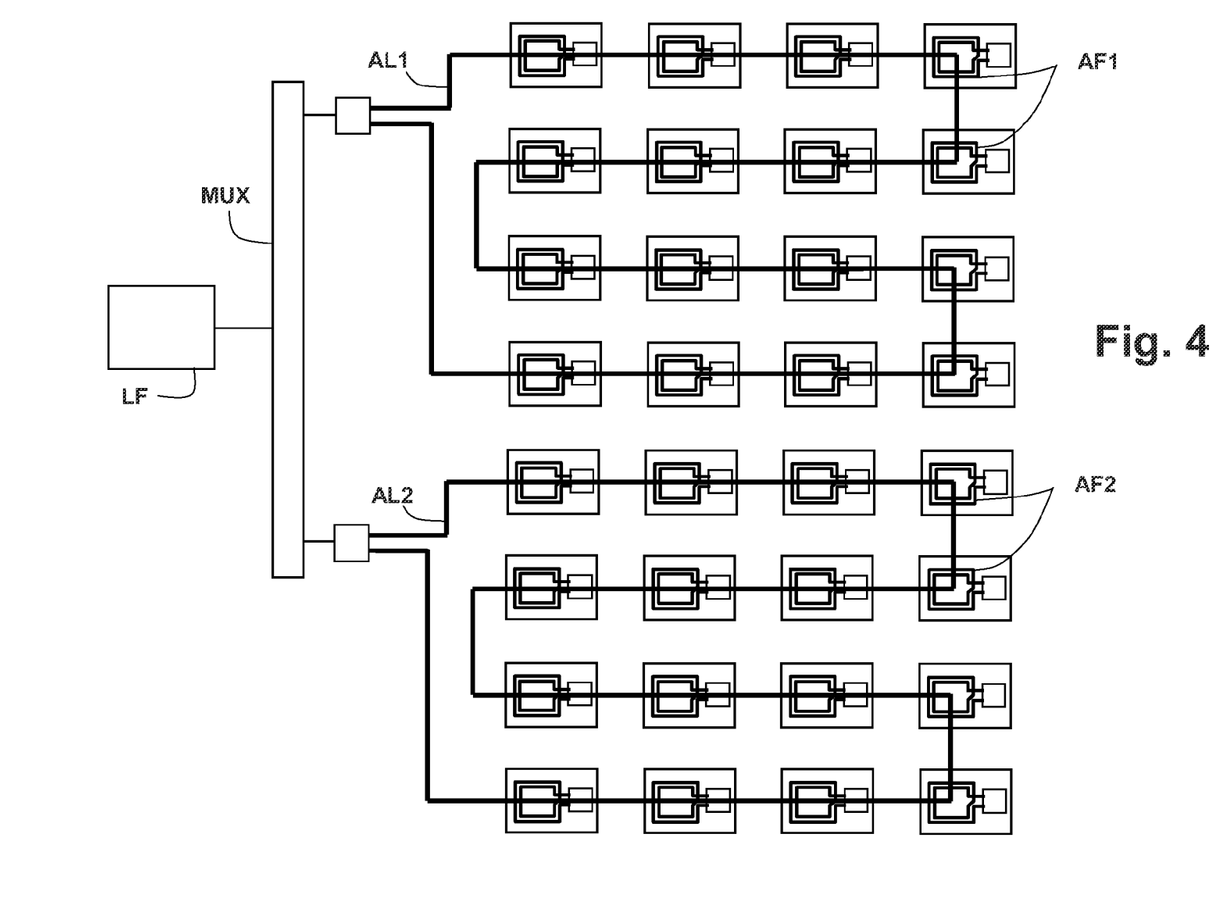
FIG. 4 represents a device with two juxtaposed reading pathways.
Figure 5:
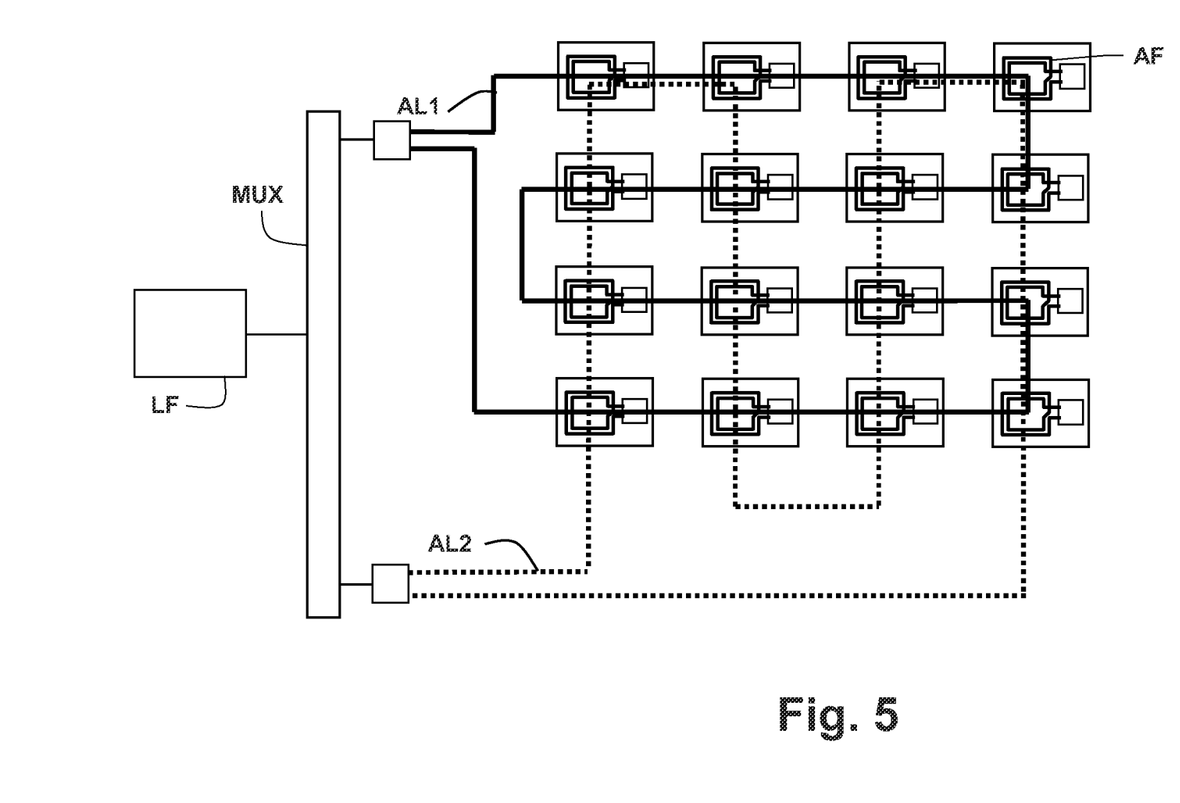
FIG. 5 represents a device with two nested reading pathways.
Figure 6:
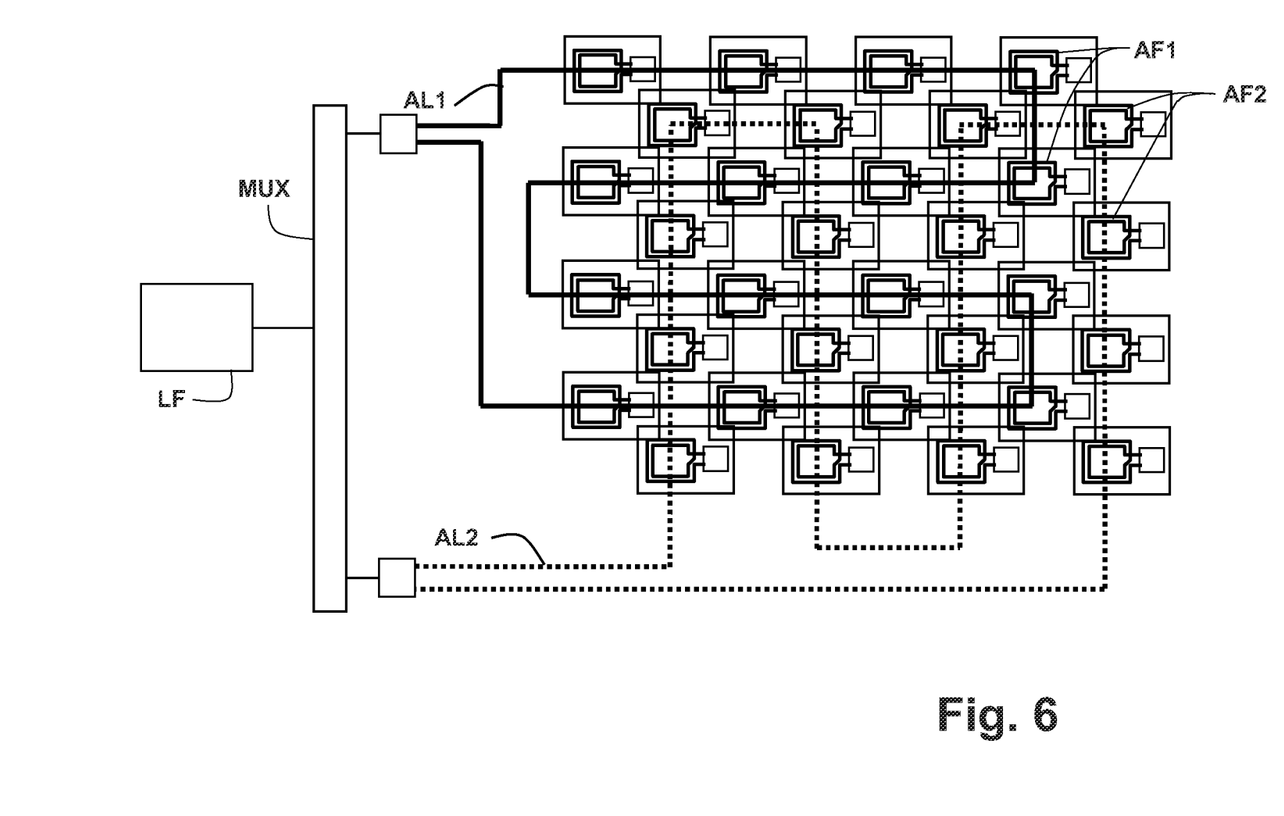
FIG. 6 represents another device with two nested reading pathways and quincuncially fixed antennas.

The reading antennas AL1, AL2 of the various pathways may be juxtaposed, in a configuration such as that of FIG. 4, or else nested one inside the other, in a configuration such as that of FIG. 5 or 6. In FIGS. 4 to 6 it has been considered for simplicity that there were only two reading pathways (and a single reader operating with time-division multiplexing for communicating alternately with each pathway). It would be possible to have a larger number of pathways.

In the configuration of FIG. 4, the mutual inductance between the antenna of any marker of a group associated with a reading pathway and the reading antenna of this pathway is zero.

In the configuration of FIG. 5, the two pathways are nested and the same markers AF are used for both pathways. There is a respective reading antenna AL1 and AL2 for each pathway. The mutual inductance between any marker antenna and one or the other antenna of the pathways is zero in the absence of any mobile tag.

In the configuration of FIG. 6, the two pathways are nested but there are two groups of markers, each group being associated with a reading pathway (and therefore a respective reading antenna). The arrangement of the markers of the two pathways is quincuncial. The second reading antenna AL2 is represented dashed. It should be noted, in this case of FIG. 6, that the antennas of the markers associated with one of the pathways (associated in the sense that their antennas are in zero mutual inductance with the reading antenna of this pathway) are not in zero mutual inductance with the reading antenna of the other pathway.

It will be understood that the determination of the location of a mobile tag depends on the configuration chosen for the antennas of the reading pathway or pathways and the markers. To explain this determination, the simple array of FIG. 1 is for example referred to, which is repeated in FIG. 7. It is possible to define a grid of lines (represented dashed in FIG. 7) whose crossover points are the N array nodes at the centre of the markers; the antennas of the markers are labelled Aij where i is a row index and j is a column index, i and j varying from 1 to 4 in this case where there are N=16 markers. The grid defines zones separated by these perpendicular dashed lines. Each zone is symbolized by a dashed circle and represents a possible position of an object whose associated tag antenna (mobile tag) would be placed in this zone.

Figure 7:
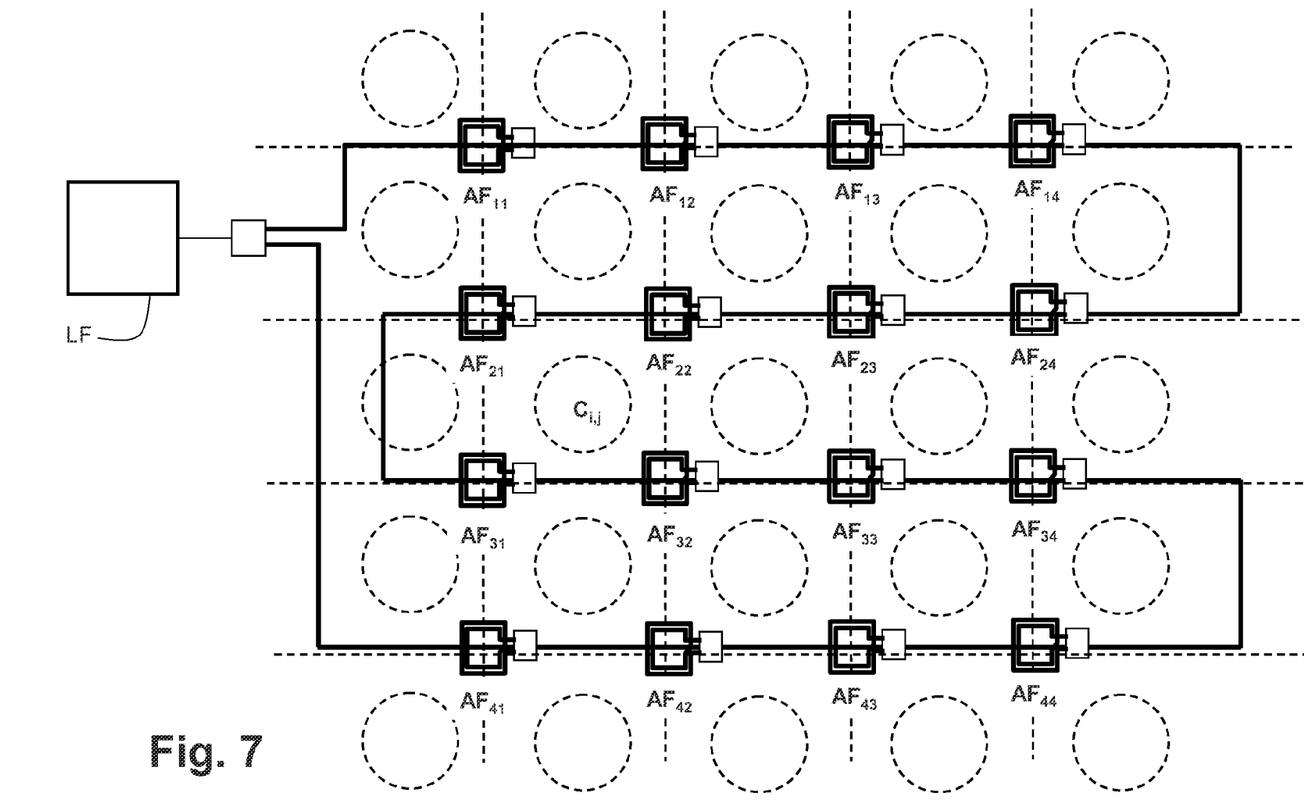
FIG. 7 represents the principle of the locating of a mobile antenna in regions defined by the rows and columns of an array of fixed antennas.

The position determination consists in determining which are the markers which react to the presence of the mobile tag because their antenna is close to the antenna of the mobile tag. For example, if the RFID reader detects a response of the four markers AF21, AF22, AF31, AF32, then it is the zone $C_{i,j}$ situated between the four antennas of these markers that is considered to contain the object.

In the location process, it is the markers which return an identification datum to the reader from the moment they are in electromagnetic coupling with the reading antenna on account of the presence of a mobile tag. The reader draws up an inventory of the identifiers of the mobile tags and markers in electromagnetic coupling with the antenna of the reading pathway concerned, by executing successive interrogations. Location can thus be performed directly from this list of identification data. Location can also be performed in an indirect manner by way of additional data provided by the markers at the request of the reader. In the first case, the inventory of RFID tags corresponds to a conventional operation of the RFID systems. In the second case, provision may be made for the marker to be provided with means for detecting the field modulation created by the mobile tag when the latter dispatches its identification response to the reader and for decoding the identifier contained in this response. The markers will be capable of intercepting the identifier of the mobile tags with which they react. These additional data gathered by the markers may be provided to the reader either in combination with the markers' identification data, or independently at the request of the reader.

In an exemplary procedure, a reading pathway dispatches a specific command addressed to the markers (or to a class of markers) by using a protocol known to these markers; the latter then pass to listening mode; next, the reader dispatches an interrogation message intended for the mobile tags that may possibly be present and recognizable by them. The mobile tag responds; this response is detected and processed by the marker or markers.

After the identification of the mobile tags and possibly of the markers in nonzero electromagnetic coupling with the reading antenna (the identifiers of all the markers may be known by design of the device), exchanges can take place between the reader and the mobile tag or the markers, the communication protocol then being a protocol with addressing of the mobile tag or of the marker, whereas in the locating and information process, the protocol is a protocol for general addressing of all the tags present and markers possibly in electromagnetic coupling with the reading antenna.

It may further be envisaged that the locating system comprise extra means for transmitting to the reader an item of information regarding the electromagnetic field level received by a marker. This information affords a supplement regarding the greater or lesser proximity between the mobile tag and the marker which is activated by the mobile tag.

The RFID reader itself can comprise means for emitting various levels of radiofrequency signal. The number of markers identified then depends on the level, a marker being able to respond to the reader only onwards of a certain signal level if it is relatively distant from the mobile tag which couples it to the reading antenna.

In the case where there are several reading pathways, with consequently several reading antennas such as AL1 and AL2, it will optionally be possible to provide means for reducing the mutual inductance between the two antennas if the resulting electromagnetic coupling disturbs the proper operation of the device. Such a decoupling may be performed by an electrical opening of the antenna circuit or circuits which are not active in such a way that no current flows around these circuits. The decoupling can also be produced by a compensation circuit which inductively links the two reading pathways so as to cancel the naturally existing coupling. Specifically, a transformer may be provided, with a primary in the circuit of one of the antennas and a secondary in the circuit of the other antenna.

The invention is applicable in all sorts of circumstances. By way of example:
- for games that might use cards, tokens placed on a table and having to be located automatically;
- for locating objects such as archive boxes on shelves which would be equipped with an array of fixed RFID antennas playing the role of markers, whereas the boxes would each be equipped with an RFID tag stuck to the bottom;
- for determining the position of objects on a linear sales display rack in a commercial store or a shelf in a stockist store.

What is claimed is:

1. A device for determining a position, with respect to known fixed positions, of an object provided with an electronic radiofrequency identification (RFID) tag having an inductive antenna, the device comprising:
   an array of N fixed RFID tags each provided with a respective inductive antenna, said N fixed RFID tags placed at said known fixed positions with respective each other, N being an integer greater than 1; and
   an RFID tag reader provided with a fixed inductive reading antenna passing in proximity to the N respective inductive antennas of the N fixed RFID tags,
   a configuration of the fixed inductive reading antenna with respect to each of the N antennas of the N fixed RFID tags being such that the mutual inductance between the inductive antenna of any one of the N fixed RFID tags and the inductive reading antenna is zero in the absence of the object, and
   means for determining a proximity of the object to a given fixed RFID tag from a non-zero coupling between said given fixed RFID tag and the inductive reading antenna, said non-zero coupling induced by a proximity between the inductive antenna of the RFID tag of the object, the inductive antenna of said given fixed RFID tag and the inductive reading antenna of the reader,
   wherein the array of fixed RFID tags is organized into rows linking centres of the antennas of the fixed RFID tags, the array defining zones situated between the rows, the device further comprising means for receiving data from several RFID tags whose antennas bracket a zone in which the object is placed.

2. The device according to claim 1, wherein the array of rows is organized into regularly distributed rows and columns.

3. The device according to claim 2, comprising at least two independent reading pathways each comprising a respective reading antenna.

4. The device according to claim 3, wherein the N RFID tags of the array are divided into groups, each group being associated with at least one respective reading pathway, the antennas of the RFID tags of one and the same group being in zero mutual inductance with the respective reading antenna of the reading pathway associated with this group.

5. The device according to claim 4, wherein the configurations of the respective reading antenna of one reading pathway delimit a planar area which is partly overlapping with an area delimited by the respective reading antenna of another reading pathway.

6. The device according to claim 2, wherein the RFID reader is able to interrogate the RFID tag of said object to be located and the N fixed RFID tags, and able to receive an identification of said RFID tag of said object when said object is situated in proximity to the array of fixed RFID tags and an identification of those RFID tags among the N fixed RFID tags that have a nonzero electromagnetic coupling with the reading antenna on account of their nonzero inductive coupling with said RFID tag of said object.

7. The device according to claim 1, further comprising at least two independent reading pathways each comprising a respective reading antenna.

8. The device according to claim 7, wherein the N RFID tags of the array are divided into groups, each group being associated with at least one respective reading pathway, the antennas of the fixed RFID tags of one and the same group being in zero mutual inductance with the respective reading antenna of the reading pathway associated with this group.

9. The device according to claim 8, wherein the configurations of the respective reading antenna of one reading pathway delimit a planar area which is partly overlapping with an area delimited by the respective reading antenna of another reading pathway.

10. The device according to claim 8, wherein the configurations of the reading antennas of the reading pathways delimit disjoint areas in a plane.

11. The device according to claim 1, wherein the RFID reader is able to interrogate the RFID tag of said object to be located and the N fixed RFID tags, and able to receive an identification of said RFID tag when the object is situated in proximity to the array of fixed RFID tags and an identification of those RFID tags among the N fixed RFID tags that have a nonzero electromagnetic coupling with the reading antenna on account of their nonzero inductive coupling with said RFID tag of said object.

12. The device according to claim 1, wherein the fixed RFID tags are able to detect and analyse identification information from the tags of said object to be located.

13. The device according to claim 1, wherein the fixed RFID tags are able to retransmit towards the reader an item of information relating to the identification of the tag of said object to be located, with which tag these fixed RFID tags have a nonzero inductive coupling.

14. The device according to claim 1, wherein the RFID reader is able to operate for various levels of radiofrequency field.

15. The device according to claim 1, comprising at least two independent reading pathways each comprising a respective reading antenna.

16. The device according to claim 15, wherein the N fixed RFID tags of the array are divided into groups, each group being associated with at least one respective reading pathway, the antennas of the RFID tags of one and the same group being in zero mutual inductance with the respective reading antenna of the reading pathway associated with this group.

17. The device according to claim 16, wherein the configurations of the respective reading antenna of one reading pathway delimit a planar area which is partly overlapping with an area delimited by the respective reading antenna of another reading pathway.

18. The device according to claim 16, wherein the configurations of the reading antennas of the reading pathways delimit disjoint areas in a plane.

19. The device according to claim 1, wherein the RFID reader is able to interrogate the RFID tag of said object to be located and the N fixed RFID tags, and able to receive an identification of said RFID tag of said object when the object is situated in proximity to the array of fixed RFID tags and an identification of those RFID tags among the N fixed RFID tags that have a nonzero electromagnetic coupling with the reading antenna on account of their nonzero inductive coupling with said RFID tag of said object.

* * * * *